United States Patent [19]
Komizo

[11] Patent Number: 5,663,552
[45] Date of Patent: Sep. 2, 1997

[54] PORTABLE INFORMATION TERMINAL APPARATUS HAVING IMAGE PROCESSING FUNCTION

[75] Inventor: Shigeo Komizo, Machida, Japan

[73] Assignee: Matsushita Electric Industrial Co., Ltd., Osaka, Japan

[21] Appl. No.: 623,811

[22] Filed: Mar. 29, 1996

Related U.S. Application Data

[63] Continuation of Ser. No. 301,626, Sep. 7, 1994, abandoned.

[30] Foreign Application Priority Data

Oct. 19, 1993 [JP] Japan ................... 5-260806

[51] Int. Cl.$^6$ ........................................... G06K 7/10
[52] U.S. Cl. ................................. 235/472; 235/462
[58] Field of Search ............................ 235/472, 462, 235/454, 471

[56] References Cited

U.S. PATENT DOCUMENTS

| | | | |
|---|---|---|---|
| 4,706,095 | 11/1987 | Ono | 347/222 |
| 4,734,710 | 3/1988 | Sato | 347/171 |
| 4,734,713 | 3/1988 | Sato | 347/171 |
| 4,746,932 | 5/1988 | Sato | 347/171 |
| 4,877,949 | 10/1989 | Danielson | 235/462 |
| 5,019,699 | 5/1991 | Koenck | 235/472 |
| 5,107,100 | 4/1992 | Shepard | 235/472 |
| 5,134,272 | 7/1992 | Tsuchiya | 235/462 |
| 5,191,197 | 3/1993 | Metlitsky | 235/472 |
| 5,227,617 | 7/1993 | Christopher | 235/462 |
| 5,276,315 | 1/1994 | Surka | 235/462 |
| 5,294,782 | 3/1994 | Kumar | 235/462 |
| 5,304,787 | 4/1994 | Wang | 235/462 |
| 5,340,971 | 8/1994 | Rockstein | 235/472 |
| 5,373,147 | 12/1994 | Noda | 235/462 |
| 5,378,881 | 1/1995 | Adachi | 235/462 |

FOREIGN PATENT DOCUMENTS

| | | |
|---|---|---|
| 0450878A1 | 10/1991 | European Pat. Off. . |
| 3154180 | 2/1991 | Japan . |
| 3-142580 | 6/1991 | Japan . |

*Primary Examiner*—Donald T. Hajec
*Assistant Examiner*—Karl Frech
*Attorney, Agent, or Firm*—Spencer & Frank

[57] ABSTRACT

A portable terminal apparatus provided with an image processing function permitting automatic image-pickup without manual focusing which includes an optical system for forming an optical image of a surface of a subject, a two-dimensional photoelectric conversion element for performing photoelectric conversion onto the formed optical image, a signal conversion device for converting an output signal of the photoelectric conversion element into a digital signal, a memory device for temporarily storing the two-dimensional image signal digitized by the signal conversion device, a subject position detecting device storing the optimum image-formation distance of the optical system in advance and for detecting the distance between the subject and the optical system, and an image inputting device including an electronic shutter device which supplies a video signal on the two-dimensional photoelectric conversion element to the memory device to hold the video signal in the memory device instantaneously when the subject position detecting device detects that the subject is located at an image-forming distance.

9 Claims, 10 Drawing Sheets

PORTABLE INFORMATION TERMINAL APPARATUS HAVING IMAGE PROCESSING FUNCTION

This application is a continuation of application Ser. No. 08/301,626, filed Sep. 7, 1994 now abandoned.

BACKGROUND OF THE INVENTION

1. Field of the Invention

The present invention relates to a small-sized portable information terminal apparatus which is used for handling mail, parcels, slips, etc. having various kinds of information placed on their surfaces by hand-writing, printing or the like, and which has various functions such as fetching a surface image of a subject, reading a character or barcode written on the surface of the subject, storing necessary information, displaying necessary information, making communication with an external device, etc.

2. Description of the Related Arts

In the business of the delivery of mail and in the distribution industry, rationalization has been attained by controlling the flow of subjects such as mail, freight, etc. on the basis of information obtained by reading characters or barcodes attached to the subject. Heretofore, apparatus for extracting information by reading characters and the like has required complex mechanism, so that the apparatus must be installed at a fixed place. Accordingly, the reading of information placed on the subject is generally performed at a fixed point such as a point on a belt conveyor in a freight depot.

However, the most efficient delivery can be made when information on the destination of the subject is known at the time of acceptance of the subject. Further, it is preferable that the path of delivery can be confirmed at a midpoint of the delivery by comparing information written on a slip or the like attached to the subject with delivery control information. Further, if the description of the type of packing at the time of acceptance and the destination of the subject is maintained on a sheet, the sheet may be used as evidence should an accident occur during transit or a dispute arise between a customer and a deliverer.

In the mail delivery service and in the distribution industry, therefore, a portable apparatus for easily reading and processing characters or the like attached to mail or freight in an arbitrary place is needed, in order to designate, control and confirm the transportation flow at the place of acceptance of the mail or freight or an arbitrary midpoint of delivery.

Conventionally, there is a portable information terminal apparatus in which characters or barcodes attached to a surface of a subject by handwriting or printing is read by sensing the surface of the subject taken in hand.

For example, in JP-A-3-142580, Kawanowa et al. has disclosed a portable data terminal apparatus having an image inputting function for acquiring information by reading a barcode printed on a surface of an article, storing, displaying and communicating the information. In the apparatus disclosed by Kawanowa et al., a surface of an article as a subject is illuminated so that image data is acquired by a CCD area image sensor through a reflection mirror and a lens, digitized to be stored, and decoded to be transmitted to an external device through a communication line. The portable data terminal apparatus disclosed by Kawanowa et al. using area image sensors can read out characters and barcodes written on a slip attached to the surface of the subject as a two-dimensional image without the movement of the apparatus relative to the subject. The image data fetched can be indicated on a display device incorporated in the apparatus and also be transmitted to an external device through a communication line.

In the aforementioned apparatus, however, sharp images can be obtained only when the optical system meets a strict condition. In order to decode the barcode correctly or read the characters correctly, it is therefore necessary to support the apparatus so that the apparatus maintains a predetermined correlation with the subject while an image is fetched. Because the apparatus is to be handled by an operator using his hands, a window is provided so that the operator can check the position of the apparatus relative to the subject by the use of his eyes. It is still difficult even for an operator skilled in the art to fetch a sufficiently sharp image. Further, because a printer for obtaining a hard copy of the result of reading the image is located at a remote external device, the hard copy cannot be supplied to the client as evidence for the accepted job.

SUMMARY OF THE INVENTION

It is therefore an object of the present invention to provide a portable information terminal apparatus in which necessary information can be acquired so that an image on a surface of a subject article can be acquired accurately and easily as a sharp image even when and change an operator operates the apparatus by hand.

It is another object of the present invention to provide an apparatus in which the results of reading of an image or barcode on a surface of a subject article at the time of acceptance of a job are displayed and recorded so that the copies thereof can be provided as occasion demands for use as evidence at the time of occurrence of an accident.

To achieve the foregoing objects, a portable information terminal apparatus of the present invention includes an image input device which comprises: an optical system for forming a surface image of a subject; a two-dimensional photoelectric conversion element for performing photoelectric conversion of the thus formed optical image; a signal conversion means for converting an output signal of the photoelectric conversion element into a digital signal; and a memory means for temporarily storing the two-dimensional image signal digitized by the signal conversion means, and further a subject position detecting means storing an image-forming distance of the optical system in advance and for detecting the distance between the subject and the apparatus, wherein the image input device fetches and holds in the memory means image signals produced in the two-dimensional photoelectric conversion element at an instant when the subject position detecting means detects that the subject to be imaged is at a predetermined distance corresponding to the image-forming distance.

Further, to achieve the foregoing objects, the apparatus according to the present invention further comprises a flashing light means for emitting light instantaneously in response to a driving signal, wherein when the subject position detecting means detect that the subject to be imaged is at the predetermined distance, a driving signal is supplied to the flashing light means to flash light to the subject to thereby obtain a video signal on the two-dimensional photoelectric conversion element and supply the video signal to the memory means.

Further, to achieve the foregoing objects, the apparatus according to the present invention further comprises a small-sized printer means for printing image data as a hard copy output, wherein the fetched video signal of the subject and other necessary information can be edited into a predetermined format and then provided as a hard copy output.

Further, to achieve the foregoing objects, the apparatus according to the present invention further comprises a barcode reading means for extracting a barcode region from video signals temporarily stored in the memory means and for reading the content of the barcode, wherein barcode information contained on the subject can be obtained through imaging the subject.

Further, to achieve the foregoing objects, the apparatus according to the present invention further comprises a barcode pattern generating means for converting information into a barcode pattern, wherein not only the content of the barcode read by the barcode reading means is retrieved into the same barcode pattern again but also the retrieved barcode pattern is combined with the fetched video signal of the subject and other necessary information into a predetermined format and then provided as a hard copy output.

Further, to achieve the foregoing objects, the apparatus according to the present invention further comprises a character reading means for cutting a predetermined character information region from video signals temporarily stored in the memory means and for reading the content of the character information, wherein the character information contained in the video signals of the subject can be obtained through imaging the subject.

Accordingly, in the portable information terminal apparatus of the present invention, the image-forming distance of the optical system is stored in the subject position detecting means in advance, so that the image of the subject can be picked up while the subject lies at the image-forming distance of the apparatus by supplying a video signal on the two-dimensional photo-electric conversion element to the memory means instantaneously when the subject position detecting means detects that the subject to be imaged is in the position corresponding to the predetermined image-formation distance. There arises an effect that sharply focused two-dimensional image data equivalent to the data obtained in the case of a fixed apparatus can be obtained in spite of the portableness of the apparatus.

Further, in the apparatus according to the present invention, the flashing light device flashes light on the subject at the time of the imaging of the subject. Accordingly, there arises an effect that sharply focused, bright and precise two-dimensional image data can be obtained.

Further, in the apparatus according to the present invention, the fetched video signal of the subject can be edited together with other necessary information into a predetermined format by the small-sized printer means and can be provided as hard copy. Accordingly, the apparatus can be used for generating necessary slips at the time a business matter arises.

Further, in the apparatus according to the present invention, image data obtained by imaging the subject is supplied to the barcode reading means to thereby make it possible to extract the barcode region from the subject image of the image data stored in the memory and read the content of the barcode. There arises an effect that the image information of the subject and the information given by the barcode can be used simultaneously.

Further, in the apparatus according to the present invention, there is provided a barcode pattern generating means for converting information into a barcode pattern, so that the contents of the barcode read by the barcode reading means can be converted into barcode patterns again. There arises an effect that the barcode pattern can be edited together with the fetched video signal of the subject and other necessary information into a predetermined format and can be provided as hard copy.

Further, in the apparatus according to the present invention, there is provided a character reading means for extracting a predetermined character information region from video signals temporarily stored in the memory means and for reading the contents thereof, so that predetermined character information in the subject image can be read by imaging the subject through the character reading means. There arises an effect that the thus read information can be used simultaneously with the fetched video signal of the subject and other information.

DESCRIPTION OF THE PREFERRED EMBODIMENTS

Figure 1:
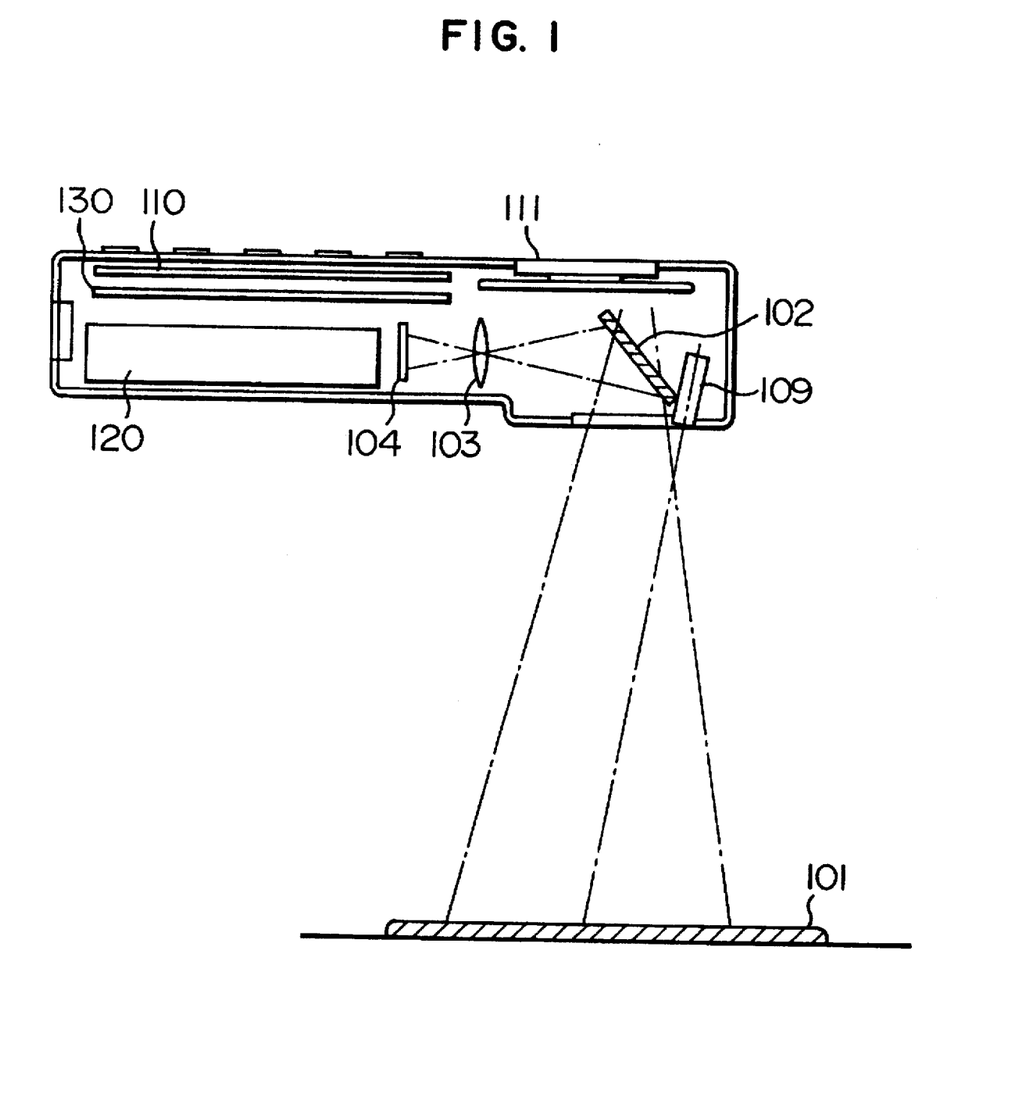
FIG. 1 is a schematic sectional view of a portable information terminal apparatus having an image processing function according to a first embodiment of the present invention.
Figure 2:
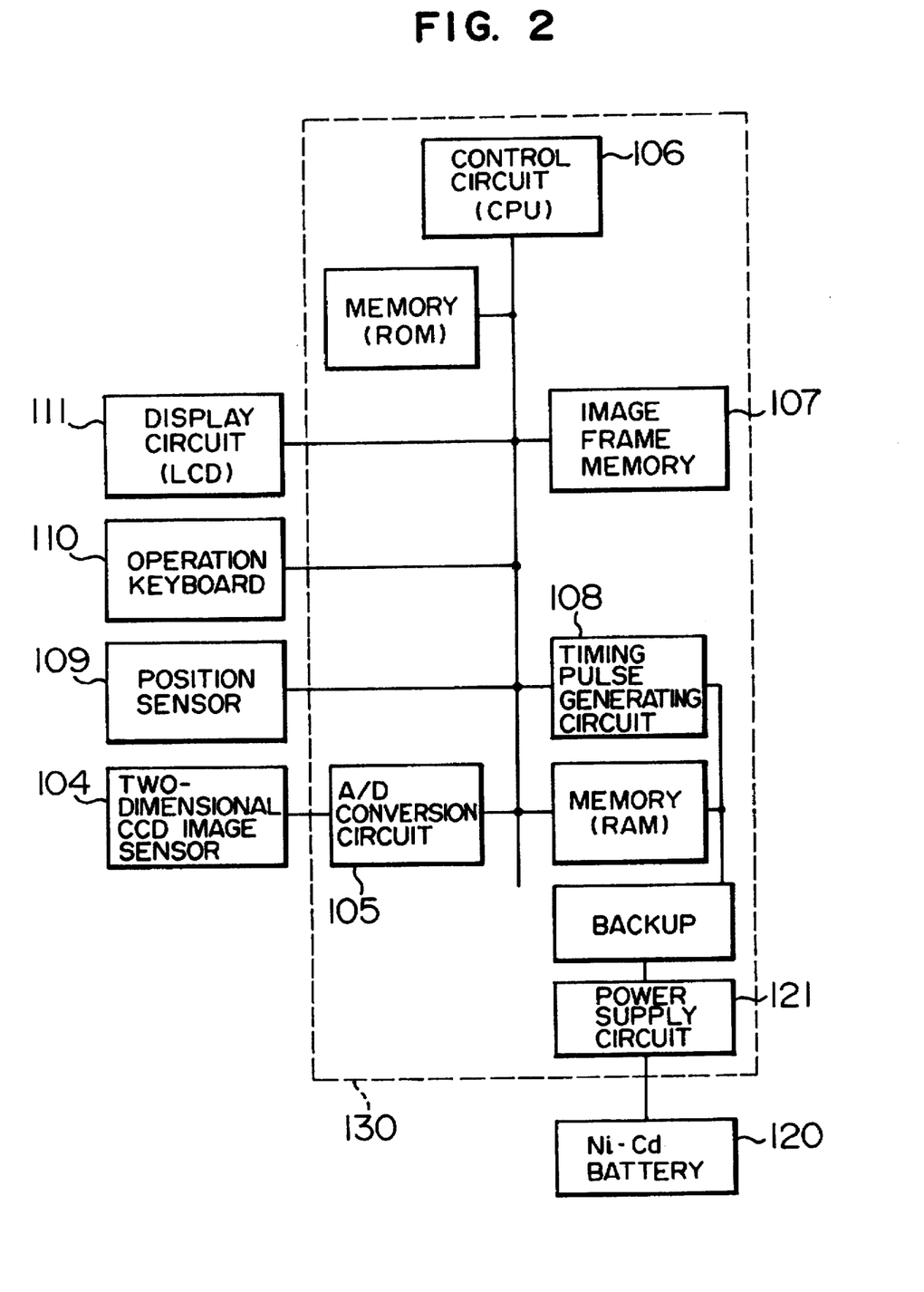
FIG. 2 is a schematic block diagram of the portable information apparatus of the first embodiment.

FIG. 1 shows the structure of an apparatus according to a first embodiment of the present invention, and FIG. 2 is a schematic block diagram of the apparatus. In FIGS. 1 and 2, a subject 101 has a surface on which various kinds of information are written. A reflection mirror 102 and an image-formation lens 103 constitute an optical system for picking up an image of the subject. A two-dimensional CCD area image sensor 104 has the function of photoelectrically converting received light energy into a quantity of electric charge and transferring the accumulated electric signal charges through a CCD analog shift-register. An A/D conversion circuit 105 converts an output of the two-dimensional CCD area image sensor 104 into a digital image signal by shaping the waveform thereof with a predetermined timing.

A control circuit (CPU) 106 performs various kinds of control including fetching of the digitized image data. An image frame memory 107 used for fetching the image data is a memory means which is controlled by the control circuit 106 so that the fetched image data are stored temporarily. A timing pulse generating circuit 108 is operated by the control circuit 106 to generate various kinds of timing pulses for operating the two-dimensional CCD area image sensor 104 and other components. A position detecting sensor 109 has a structure in which the position detecting sensor transmits an ultrasonic signal and receives a signal reflected from subject to thereby detect the position of the subject. Further, there is stored information defining the optimum distance between the subject 101 and the body of the apparatus to set the subject 101 in an image-formation position of the aforementioned optical system.

An operation keyboard 110 is used for inputting job instructions, various kinds of information and so on. A display circuit 111 displays input information, various results of processing thereof, image data stored in the image frame memory 107, and so on. A battery 120 and an electric source circuit 121 are provided for supplying power to various kinds of devices including the control circuit 106. As shown in FIGS. 2, 4, 6, 7, 8 and 10 which illustrate the first to sixth embodiments of the present invention, the battery 120 includes a Ni—Cd battery, for example, and the electric source circuit 121 indicates a power supply functioning as a connection circuit for external connection to the external battery 120 and also for internal connection to the various load devices via a backup device which provides an alternative power source that can be used in the event of failure or replacement of the external battery 120. A main substrate 130 has various kinds of circuits including the control circuit 106 mounted thereon.

The operation of the apparatus in the aforementioned embodiment will be described below. In the aforementioned embodiment, in order to pick up an image of the subject 101, the apparatus body is moved up slowly above the subject 101 so as to come to the image-forming position. In this occasion, the position detecting sensor 109 transmits an ultrasonic signal and receives a signal reflected from the subject 101 to thereby measure the distance between the apparatus body and the subject 101 continuously. When the distance between the apparatus body and the subject reaches a predetermined value due to the upward movement of the apparatus body, the position detecting sensor 109 detects the fact that the positional relation between the apparatus body and the subject 101 accords with the preliminarily stored information of optimum distance between the subject 101 and the apparatus body, and issues a detection signal to the control circuit 106. Upon reception of the detection signal, the control circuit 106 controls various kinds of circuits including the image frame memory 107 so that image data on the two-dimensional CCD area image sensor 104 which is receiving light at that point of time is fetched and stored in the image frame memory 107.

As described above, in this embodiment, the position detecting sensor 109 detects the fact that the subject 101 is placed in the image-forming position, so that the image data can be held in the image frame memory 107 at that point of time. Accordingly, there arises an advantage that sharply focused image data can be inputted.

Figure 3:
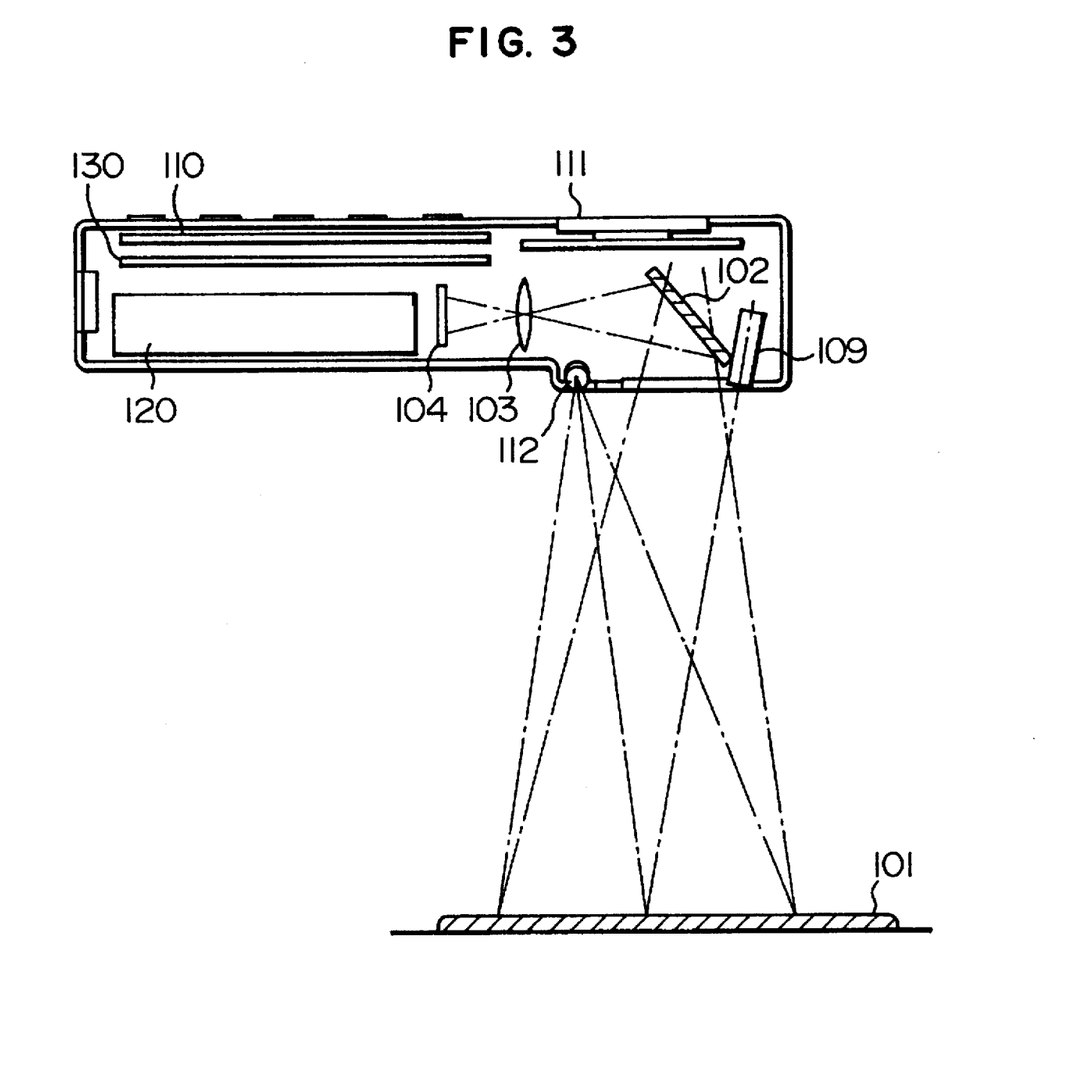
FIG. 3 is a schematic sectional view of a portable information terminal apparatus having an image processing function according to a second embodiment of the present invention.
Figure 4:
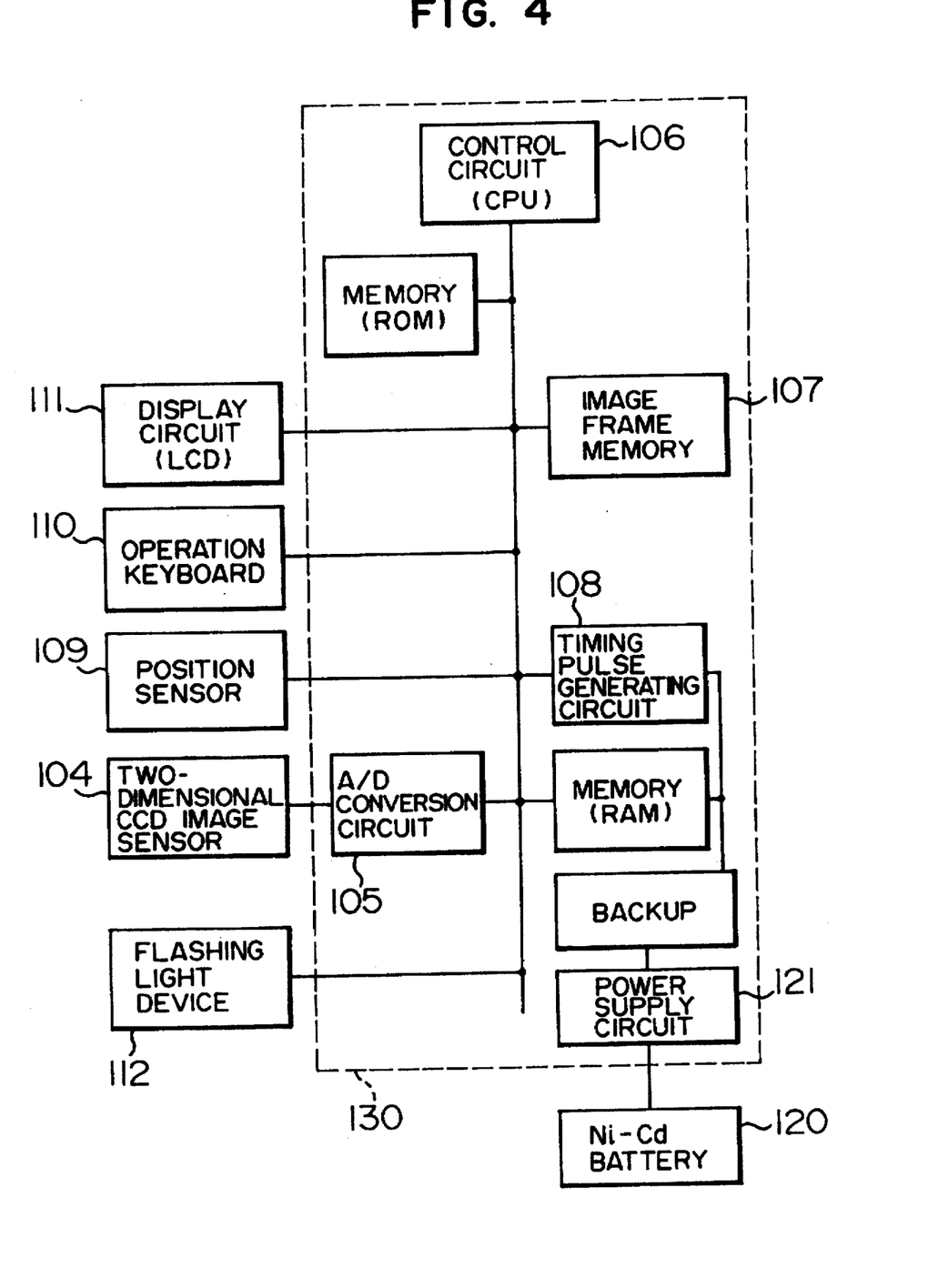
FIG. 4 is a schematic block diagram of the portable information terminal apparatus of the second embodiment.

FIG. 3 shows the structure of an apparatus according to a second embodiment of the present invention, and FIG. 4 is a schematic block diagram of the apparatus. In FIGS. 3 and 4, a flashing light device 112 is disposed to illuminate the position of the subject 101 and is controlled by the control circuit 106 to flash light instantaneously. Except for the above, the second embodiment has the same structure as that of the first embodiment shown in FIGS. 1 and 2.

The operation of the apparatus in the aforementioned embodiment will be described below. In the aforementioned embodiment, in order to pick up an image of the subject 101, the apparatus body is moved up slowly above the subject 101 so as to come to the image-forming position. When this occurs, the position detecting sensor 109 transmits an ultrasonic signal and receives a signal reflected from the subject 101 to thereby measure the distance between the apparatus body and the subject 101 continuously. When the apparatus body is moved upward until it reaches a predetermined height, the position detecting sensor 109 detects the fact that the positional relation between the apparatus body and the subject 101 accords with the preliminarily stored information of optimum distance between the subject 101 and the apparatus body, and issues a detection signal to the control circuit 106. Upon reception of the detection signal, the control circuit 106 issues a light emission request signal to the flashing light device 112. Upon reception of the light emission request signal, the flashing light device 112 flashes light directly on the subject 101. At the same time, the control circuit 106 which has received the detection signal controls various kinds of circuits including the image frame memory 107 so that image data on the two-dimensional CCD area image sensor 104 formed at the instant of the flashing is fetched and stored in the image frame memory 107.

As described above, in the second embodiment, the position detecting sensor 109 detects the fact that the subject 101 is placed in the image-forming position, so that not only light can be flashed to the subject 101 instantaneously at the time of the detection but also the image of the subject 101 can be held in the image frame memory 107 at that instant. Accordingly, there arises an advantage that sharply focused and bright image data can be inputted even in the case where the subject is in a dark environment or the subject is shaded by the apparatus.

Figure 5A:
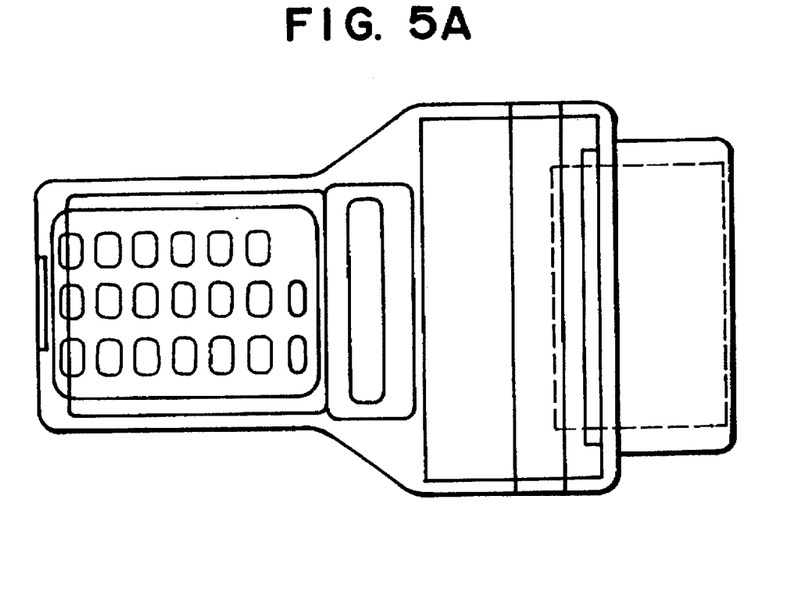
FIG. 5A is a plan view of a portable information terminal apparatus having an image processing function according to a third embodiment of the present invention.
Figure 5B:
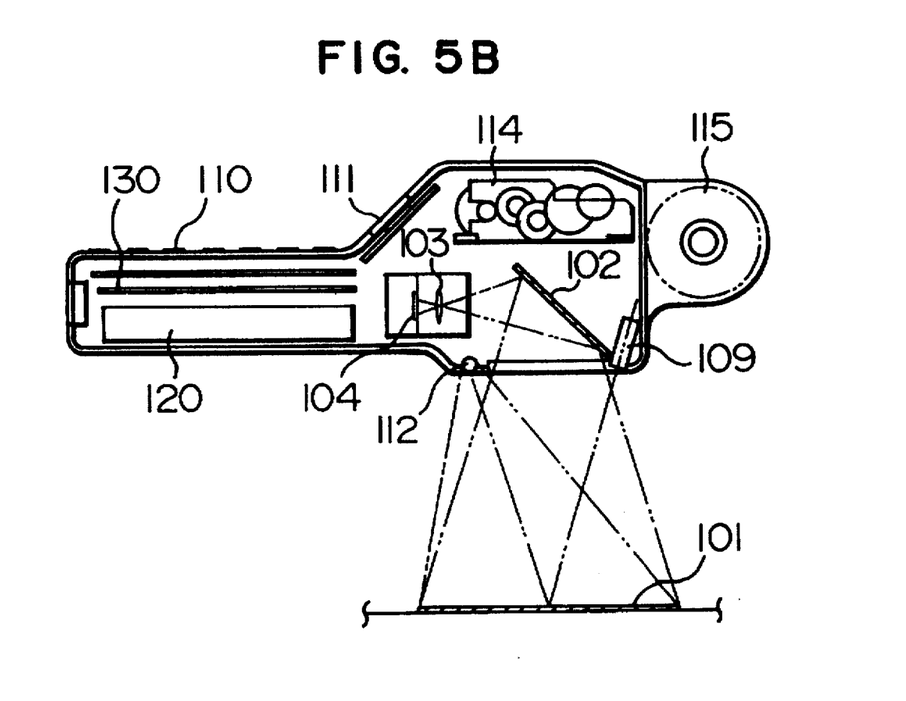
FIG. 5B is a side sectional view of the portable information terminal apparatus of the third embodiment.
Figure 6:
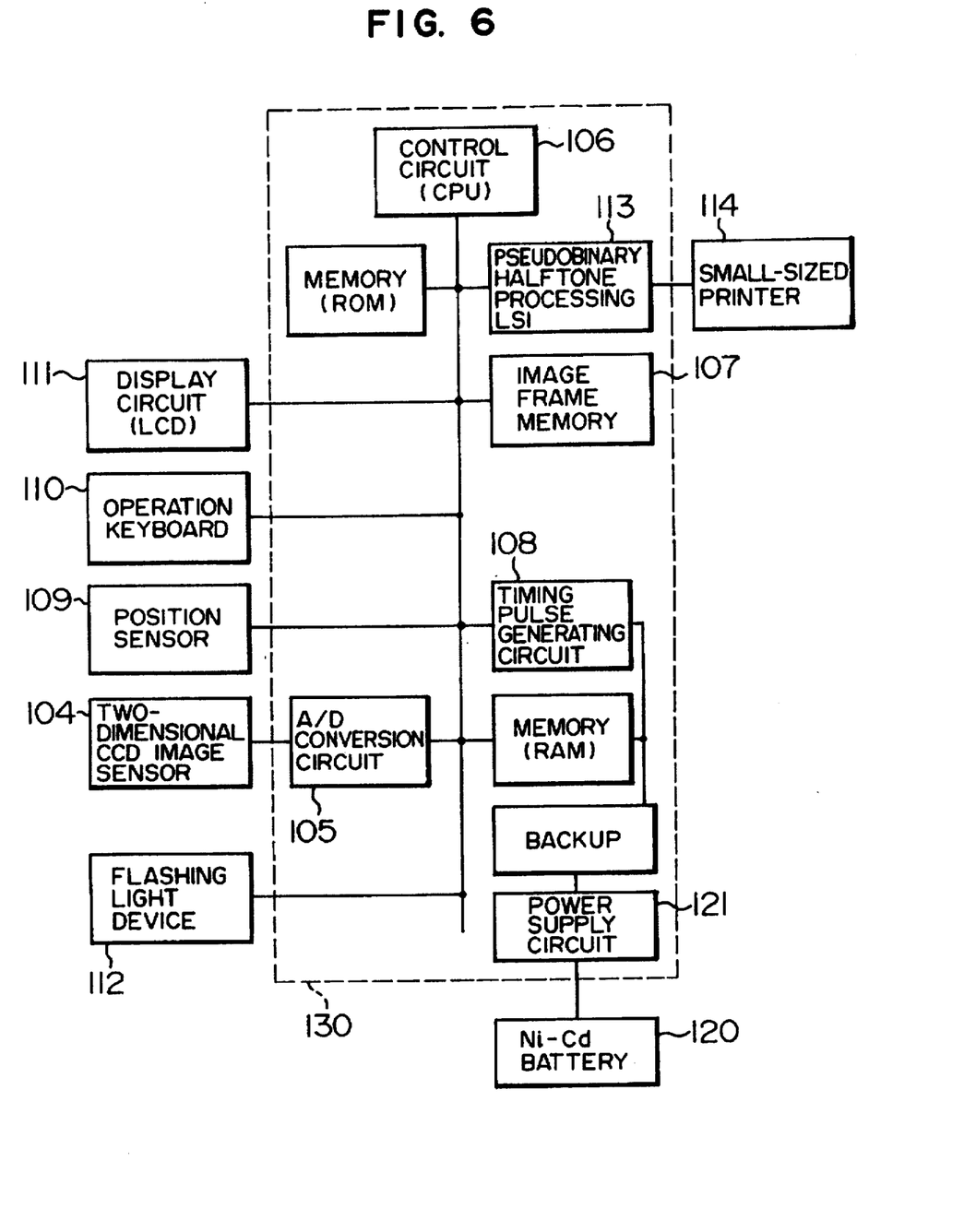
FIG. 6 is a schematic block diagram of the portable information terminal apparatus of the third embodiment.

FIG. 5A is a plan view showing the structure of an apparatus according to a third embodiment of the present invention, FIG. 5B is a side sectional view showing the structure of the apparatus of FIG. 5A, and FIG. 6 is a schematic block diagram of the apparatus. In FIGS. 5A, 5B and 6, a pseudobinary halftone processing LSI 113 serves as a multiple state to binary state image data conversion circuit which incorporates an algorithm by which multiple state image data can be expressed as halftones through binary state image data without extreme lowering of resolution. A line printer 114 is provided which is sufficiently light in weight and small in size. The line printer 114 is controlled by the control circuit 106 so that information transmitted through the pseudobinary halftone processing LSI 113 can be outputted for printing on a rolled sheet 115. Except for these, the third embodiment has the same structure as shown in FIG. 4.

The operation of the apparatus of FIGS. 5A, 5B and 6 will be described below. In this embodiment, image data held in the image frame memory 107 is controlled by the control circuit 106 so that the image data is edited together with the other necessary information into a predetermined format and supplied to the pseudobinary halftone processing LSI 113. Not only the multiple state image data supplied to the pseudobinary halftone processing LSI 113 is transformed to a binary state variable so that a half-tone image can be expressed without extreme lowering of resolution, but also a devised arrangement of pixels after the binary conversion is elaborated before the image data is outputted to the small-sized line printer 114. In elaborating in the arrangement of the pixels, there is used an image processing algorithm called a "correlative density assignment of adjacent pixels" method (CAPIX) which has been proposed by the Applicant of this invention, as well as dithering as taught by L. G. Roberts generally used for performing binary conversion by changing a threshold of the binary conversion in accordance with random digits. CAPIX is a binary conversion method for expressing gradations by redistributing black pixels from the position of the highest-density pixel in a window of n×n pixels while scanning the window whenever the sum of indexes representative of the color density of pixels in the window exceeds a multiple of a predetermined value. The small-sized line printer 114 outputs the image data and the other necessary information edited into a predetermined format to print a binary state image data on the sheet 115.

As described above, in the aforementioned third embodiment, the subject position detecting sensor 109 having the image-formation distance of the optical system stored therein in advance and for detecting the position of the subject 101 is added to a portable terminal apparatus having an image inputting function. When the subject 101 to be picked up as an image is detected by the subject position detecting sensor 109, the optical image on the two-dimensional CCD area image sensor 104 at that instant is fetched as image data and stored in the image frame memory 107, and the thus fetched image data is edited together with the other necessary information into a predetermined format and supplied as a print output to the small-sized line printer 114 through the pseudobinary halftone processing LSI 113. Accordingly, there arises an effect whereby a slip formed of one sheet of paper written with the surface image of the subject expressed as a halftone image without extreme lowering of resolution with respect to the eyes of a human and other necessary information can be generated.

Figure 7:
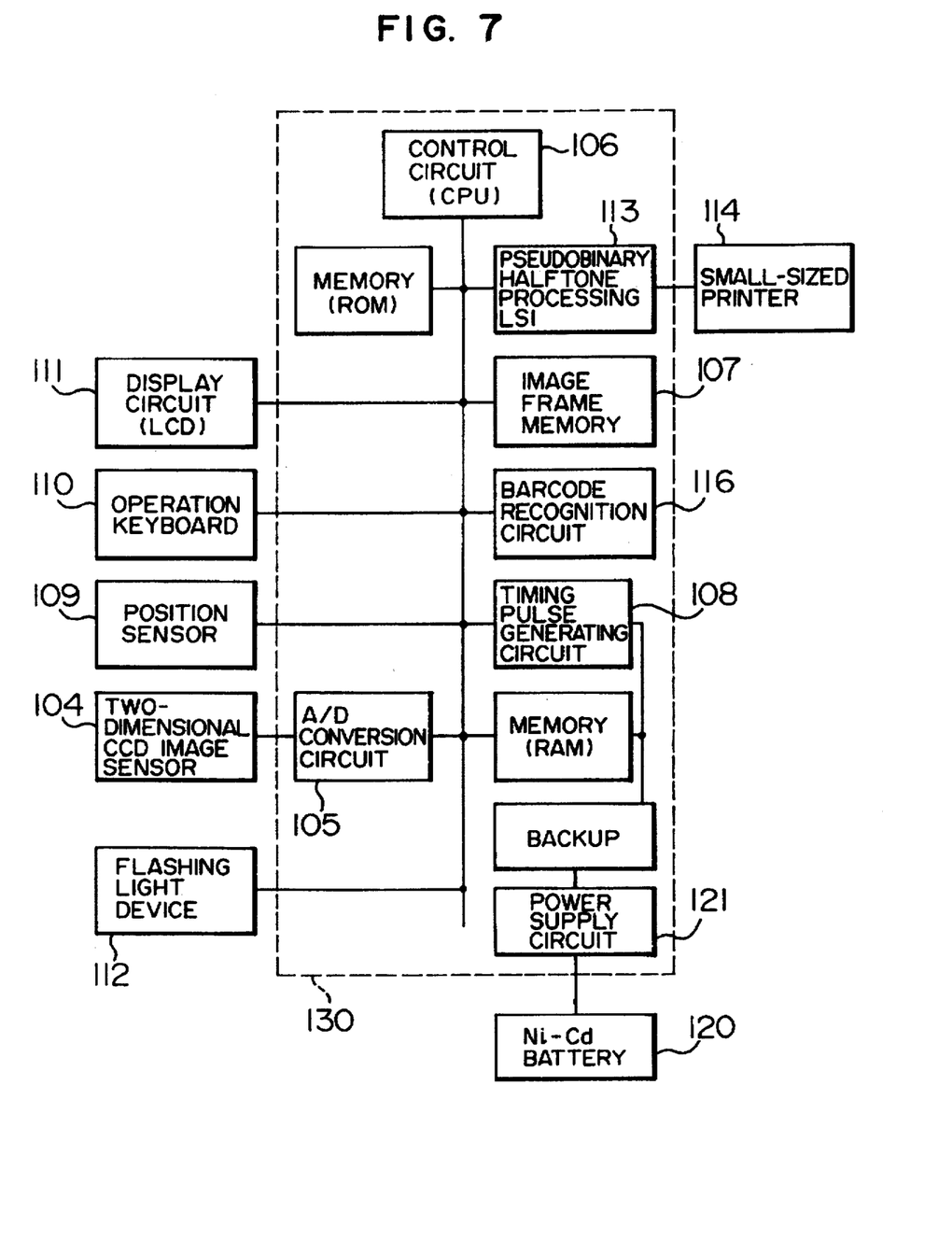
FIG. 7 is a schematic block diagram of a portable information terminal apparatus having an image processing function according to a fourth embodiment of the present invention.

FIG. 7 is a schematic block diagram showing the structure of an apparatus according to a fourth embodiment of the present invention. In FIG. 7, a barcode recognition circuit 116 has a function of detecting the position and direction of a barcode pattern region by performing a process such as image emphasis, contour extraction, selective expansion, contraction, various kinds of masking correction, etc. onto image data stored in the image frame memory 107, and a function of decoding the contents of the barcode pattern region and outputting results of the decoding. Except for the above, the fourth embodiment has the same structure as in FIGS. 3 and 4.

The operation of the apparatus in the embodiment of FIG. 7, will be described below. In the embodiment of FIG. 7, when image data of the subject 101 obtained by picking up an image of the subject 101 is held in the image frame memory 107, the barcode recognition circuit 116 is controlled by the control circuit 106 so that a process such as image emphasis, contour extraction, selective expansion, contraction, various kinds of masking correction, etc. is applied to the image data of the subject 101 held in the image frame memory 107 to thereby detect the barcode pattern region and, at the same time, an arithmetic operation is applied to results of the detection to thereby determine the position and direction of the barcode pattern region. Then, the barcode recognition circuit 116 extracts the barcode pattern region from the image data of the subject 101 held in the image frame memory 107 on the basis of the results obtained by the aforementioned process and decodes the contents thereof successively. The control circuit 106, reading the contents of the barcode from the image data, edits the image data held in the image frame 107, together with the results of the reading of the barcode and the other necessary information, into a predetermined format and supplies these data to the pseudobinary halftone processing LSI 113. The pseudobinary halftone processing LSI 113 converts the supplied data into binary state data capable of expressing a halftone image imitatively and supplies the binary state data to the small-sized line printer 114 to thereby print the data in the same manner as in the third embodiment.

As described above, in the aforementioned fourth embodiment, the subject position detecting sensor 109 having the image-formation distance of the optical system stored therein in advance and for detecting the position of the subject 101 is added to a portable terminal apparatus having an image inputting function, so that when the subject 101 to be picked up as an image is detected by the subject position detecting sensor 109, not only the optical image on the two-dimensional CCD area image sensor 104 at that instant is fetched as image data and stored in the image frame memory 107 but also the barcode recognition circuit 116 extracts the barcode pattern region from the thus fetched image data and decodes the contents thereof to thereby supply the results of the reading of the barcode and other necessary information to the fetched image data to thereby edit these data into a predetermined format and supply these data as a print output to the small-sized line printer 114. Accordingly, there arises an effect that not only the surface image of the subject 101 and the information given as a barcode to the subject 101 can be used simultaneously but also a slip in which the information and other necessary information are written on one sheet can be generated.

Figure 8:
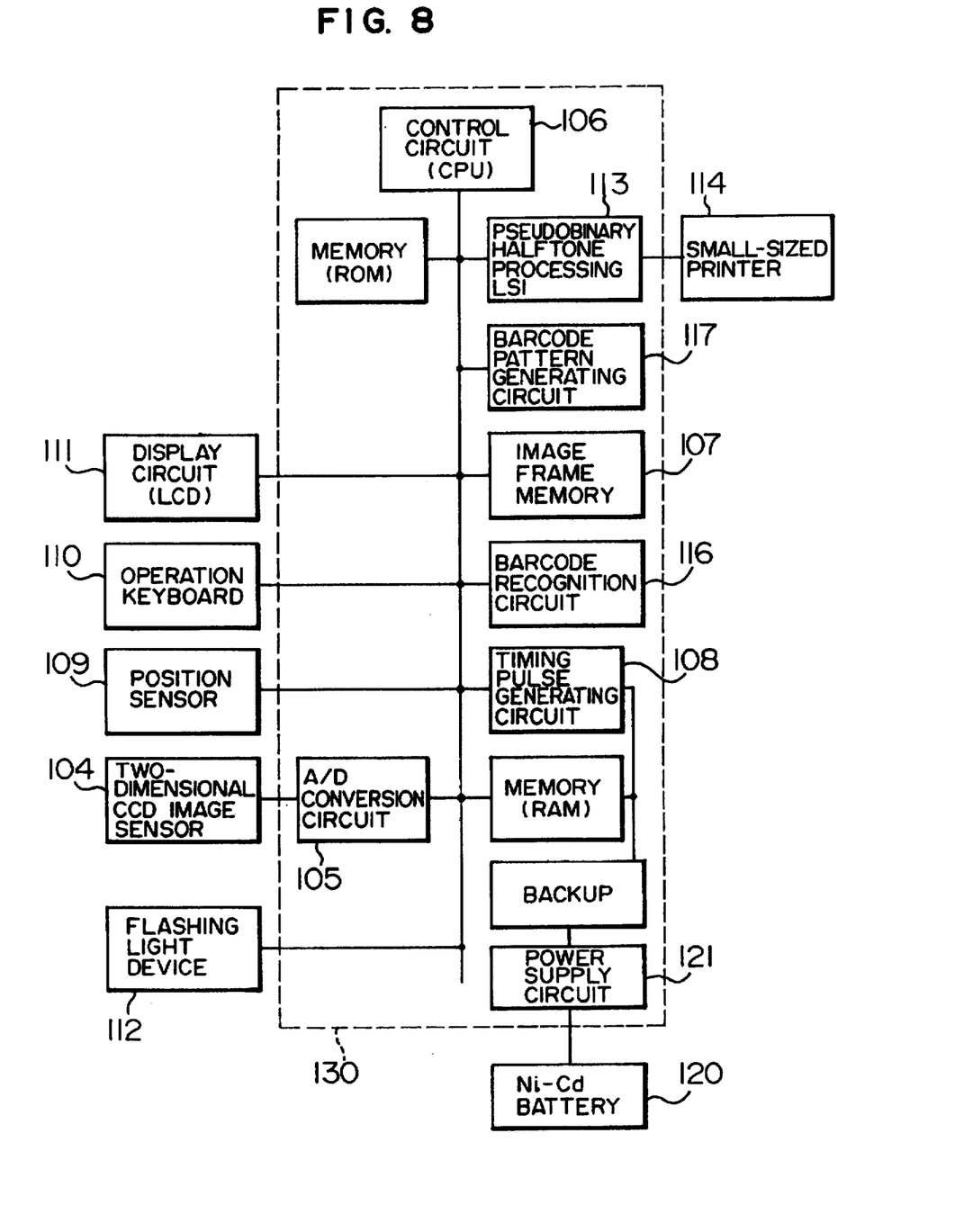
FIG. 8 is a schematic block diagram of a portable information terminal apparatus having an image processing function according to a fifth embodiment of the present invention.

FIG. 8 is a schematic block diagram showing the structure of an apparatus according to a fifth embodiment of the present invention. In FIG. 8, a barcode pattern generating circuit 117 is controlled by the control circuit 106 so that predetermined information can be converted into and outputted as a barcode pattern. Except for this, the fifth embodiment has the same structure as in FIG. 7.

The operation of the apparatus in the aforementioned embodiment will be described below. In the aforementioned embodiment, when image data of the subject 101 obtained by picking up an image of the subject 101 is held in the image frame memory 107, the barcode recognition circuit 116 is controlled by the control circuit 106 to extract the barcode pattern region from the image data of the subject 101 held in the image frame memory 107 and read the contents thereof. When the barcode recognition circuit 116 reads the contents of the barcode from the image data, the control circuit 106 controls the barcode pattern generating circuit 117 to convert the thus read contents of the barcode into a barcode pattern again and, at the same time, the image data held in the image frame memory 107 is edited together with the regenerated barcode pattern and the other necessary information into a predetermined format and supplied to the pseudobinary halftone processing LSI 113. The pseudobinary halftone processing LSI 113 converts the supplied data into two-valued data capable of expressing a halftone image imitatively and supplies the two-valued data to the small-sized line printer 114 to thereby print the data.

Figure 9:
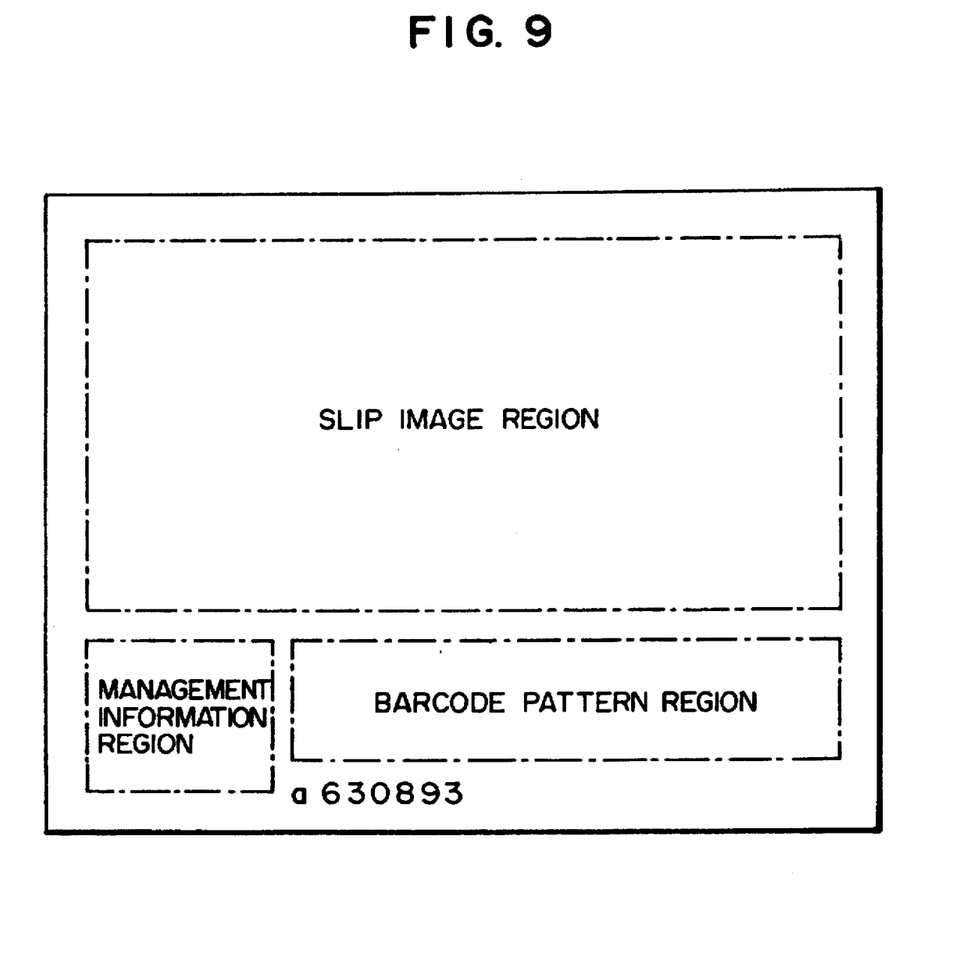
FIG. 9 is a view of a slip format generated in the portable information terminal apparatus of the fifth embodiment.

As described above, in the aforementioned fifth embodiment, the subject position detecting sensor 109 having the image-forming distance of the optical system stored therein in advance and for detecting the position of the subject 101 is added to a portable terminal apparatus having an image inputting function, so that when the subject 101 to be picked up as an image is detected by the subject position detecting sensor 109, not only the optical image on the two-dimensional CCD area image sensor 104 at that instant is fetched as image data and stored in the image frame memory 107 but also the barcode recognition circuit 116 extracts the barcode pattern region from the thus fetched image data, decodes the contents thereof and converts the decoded contents into a barcode pattern again to thereby edit the fetched image data together with the other necessary information into a predetermined format containing the barcode pattern reproduced from the results of the decoding of the barcode and supply these data as a print output to the small-sized line printer 114. Accordingly, there arises an effect that the barcode information to be given to the subject 101 can be written as a barcode pattern on a one sheet slip as well as the surface image of the subject 101 and other necessary information. FIG. 9 shows a view of a slip format generated by the portable information terminal apparatus having the image processing function in this embodiment.

A slip contains a large region for expressing a slip image, a region for expressing a barcode pattern and a region for expressing various kinds of management information and further has the slip issuing date printed therein.

Figure 10:
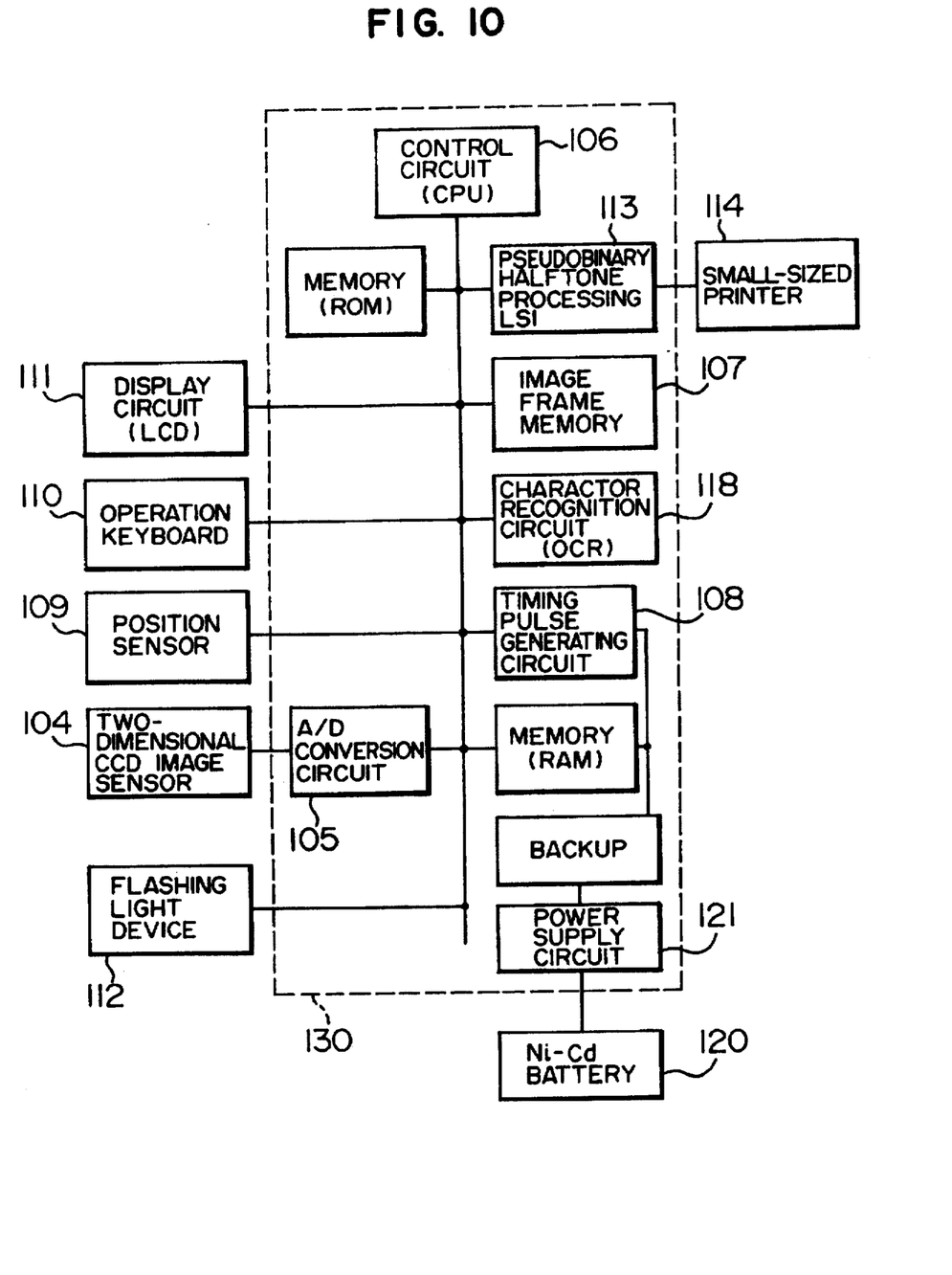
FIG. 10 is a schematic block diagram of a portable information terminal apparatus having an image processing function according to a sixth embodiment of the present invention.

FIG. 10 is a schematic block diagram showing the structure of an apparatus according to a sixth embodiment of the present invention. In FIG. 10, a character recognition circuit (OCR) 118 has a function of detecting the position of a region to be read by performing a process such as image emphasis, contour extraction, selective expansion, contraction, various kinds of masking correction, etc. onto the image data held in the image frame memory 107, and a function of decoding the character contents of the region to be read the outputs resulting therefrom. Except for the above, the sixth embodiment has the same structure as shown in FIG. 6.

The operation of the apparatus in the afore-mentioned embodiment will be described below. In the aforementioned embodiment, when image data of the subject 101 obtained by picking up an image of the subject 101 is held in the image frame memory 107, the character recognition circuit 118 is controlled by the control circuit 106 to perform a process such as image emphasis, contour extraction, selective expansion, contraction, various kinds of masking correction, etc. onto the image data of the subject 101 held in the image frame memory 107 to thereby detect the region to be read and perform an arithmetic operation onto the results of the detection to thereby determine the position and direction of the region to be read. Then, the character recognition circuit 118 extracts the region to be read from the image data of the subject 101 held in the image frame memory 107 on the basis of the results obtained by the aforementioned process and decodes the contents thereof successively. The control circuit 106 which has read predetermined character information from the image data edits the image data held in the image frame memory 107 together with the thus read character information and other necessary information into a predetermined format and supplies the edited information to the pseudobinary halftone processing LSI 113. The pseudo-binary halftone processing LSI 113 converts the supplied data into binary state data capable of expressing a halftone image imitatively and supplies the binary state data to the small-sized line printer 114 to print out the data.

As described above, in the aforementioned sixth embodiment, the subject position detecting sensor 109 having the image-forming distance of the optical system stored therein in advance and for detecting the position of the subject 101 is added to a portable terminal apparatus having an image inputting function, so that when the subject 101 to be picked up as an image is detected by the subject position detecting sensor 109, not only the optical image on the two-dimensional CCD area image sensor 104 at that instant is fetched as image data and stored in the image frame memory 107 but also the character recognition circuit 118 extracts the region to be read from the fetched image data and decodes the contents thereof to thereby give the thus read character information and other necessary information to the fetched image data to edit the information into a predetermined format and supply the information as a print output to the small-sized line printer 114. Accordingly, there arises an effect that not only the surface image of the subject 101 and the predetermined character information given to the subject 101 can be used simultaneously but also the predetermined character information given to the subject 101 can be written together with the surface image of the subject 101 and the other necessary information on a one sheet slip.

As is obvious from the description of the aforementioned embodiments, the description of the present invention has the following effects:

1. A subject position detecting sensor having the image-forming position of the optical system stored therein in advance and for detecting the position of a subject is added to a portable terminal apparatus having an image inputting function, so that the subject position detecting sensor can detect the fact that the subject to be picked up as an image is in the image-forming position, can fetch the optical image on the two-dimensional CCD area image sensor as image data at that instant and can hold the image data in the image frame memory. Accordingly, there arises an effect that sharply focused image data can be inputted into the portable terminal apparatus.

2. At the moment the subject position detecting sensor detects the fact that the subject to be picked up as an image is in the image-forming position, the subject is illuminated by a flash of light emitted by a flashing light device.

3. Further, the optical image on the two-dimensional CCD area image sensor at the instant the light is flashed can be fetched as image data and can be held in the image frame memory. Accordingly, there arises an advantage that sharply focused and bright image data can be inputted into the portable terminal apparatus.

4. A small-sized line printer is incorporated in the portable terminal apparatus having an image input function. Accordingly, there arises an effect whereby a single slip on which the surface image of the subject thus picked up and other necessary information is written can be generated.

5. A pseudobinary halftone processing LSI is provided in a stage prior to the small-sized line printer. Accordingly, there arises an effect whereby the surface image of the subject picked up can be printed out as a halftone image without extreme lowering of resolution with respect to the eyes of a human.

6. A barcode recognition circuit is incorporated in the apparatus. Accordingly, there arises an effect whereby the barcode pattern region can be extracted from the image data held in the image frame memory and the contents thereof decoded.

7. Because the barcode recognition circuit is incorporated in the apparatus, barcode information given to the subject can be read from the image data of the subject by picking up the image of the subject containing the barcode. Accordingly, there arises an effect whereby the fetched image data and the read barcode information can be used simultaneously.

8. Further, not only the barcode recognition circuit but also the small-sized line printer are incorporated in the apparatus. Accordingly, there arises an effect whereby a single slip can be generated which has printed thereon the surface image of the subject being picked up, the barcode information placed on the subject and other necessary information are edited into a predetermined format.

9. Because the barcode recognition circuit and a barcode pattern generating circuit are incorporated in the apparatus and because the small-sized line printer 114 is contained in the apparatus, there arises an effect whereby a single slip on which the surface image of the subject picked up, the barcode information given to the subject and expressed in a barcode pattern and other necessary information are edited into a predetermined format which can be generated by converting the thus read barcode information into a barcode pattern again.

10. Because a character recognition circuit is incorporated in the apparatus, predetermined character information can be read from the image data of the subject by picking up the image of the subject containing the predetermined character information written therein. Accordingly, there arises an effect whereby the fetched image data and the thus read predetermined character information can be used simultaneously.

What is claimed is:

1. A portable information terminal apparatus having an image processing function, comprising:

an optical system for forming an optical image of a surface of a subject;

a two-dimensional photoelectric conversion element for performing photoelectric conversion of the formed optical image into a two-dimensional image signal;

a signal conversion means for converting said two-dimensional image signal of said photoelectric conversion element into a digital image signal;

a memory means for temporarily storing said digital image signal;

a subject position detection means including a position sensor for transmitting an ultrasonic wave signal to the subject and for receiving a reflected signal reflected therefrom, said position sensor continuously measuring a distance between the subject and said optical system, the subject position detection means having stored therein a predetermined value corresponding to an image-formation distance of said optical system, said subject position detection means generating a detection signal when the distance measured by said position sensor corresponds to said predetermined value;

an image inputting means including an image signal fetching means for receiving said detection signal, said image signal fetching means supplying instantaneously said digital image signal to said memory means upon receipt of said detection signal, said digital image signal being held in said memory means when said subject position detection means detects that the subject to be picked up as an image is located at a distance from said optical system corresponding to said predetermined value; and output means for reading out the digital image signal stored in said memory means, said output means editing the read-out digital image signal together with other information in a predetermined format, and outputting the result of said editing.

2. An apparatus according to claim 1, further comprising:

a flashing light means for emitting light instantaneously in response to an external signal, said image inputting means supplying a light-emission request signal to said flashing light means to flash light on to the subject thereby obtaining an enhanced image signal on said two-dimensional photoelectric conversion element when said subject position detection means detects that the subject to be picked up as an image is located at the distance corresponding to said predetermined value.

3. An apparatus according to claim 2, further comprising a character reading means for extracting a predetermined character information region from said digital image signal temporarily stored in said memory means and for reading the contents thereof, wherein the predetermined character information contained in the subject is read from the image of the subject.

4. An apparatus according to claim 1, wherein said output means includes a small-sized printer means for printing the edited read-out image signal as a hard copy output.

5. An apparatus according to claim 4, further comprising a character reading means for extracting a predetermined character information region from said digital image signal temporarily stored in said memory means and for reading the contents thereof, wherein the predetermined character information contained in the subject is read from the image of the subject.

6. An apparatus according to claim 1, further comprising a barcode reading means for extracting a barcode region from said digital image signal temporarily stored in said memory means and for reading contents thereof, wherein barcode information contained in the subject is read from the image of the subject.

7. An apparatus according to claim 6, further comprising a barcode pattern generating means for converting information into a barcode pattern, wherein the contents of the barcode read by said barcode reading means are converted into a barcode pattern again and the barcode pattern is edited together with the fetched digital image signal of the subject and other information into a predetermined format and produced as a hard copy output.

8. An apparatus according to claim 1, further comprising a character reading means for extracting a predetermined character information region from said digital image signal temporarily stored in said memory means and for reading the contents thereof, wherein the predetermined character information contained in the subject is read from the image of the subject.

9. A portable information terminal apparatus having an image processing function, comprising:

an optical system for forming an optical image of a surface of a subject;

a photoelectric conversion element for performing photoelectric conversion of the formed optical image into a converted image signal;

a memory means for temporarily storing said converted image signal;

a subject position detecting means having a predetermined value corresponding to an image-formation distance of said optical system stored therein in advance, said detecting means detecting a distance between the subject and said optical system;

an image inputting means including an image signal fetching means which supplies said converted image signal to said memory means to hold the converted image signal in said memory means instantaneously when said subject position detecting means detects that the subject to be picked up as an image is located at a distance from said optical system of said predetermined value;

a barcode recognition means for extracting a barcode pattern region from said converted image signal temporarily stored in said memory region and for reading out contents of the extracted barcode pattern region; and output means for reading out the converted image signal stored in said memory means, editing the read-out converted image signal together with other information including the contents of the extracted barcode pattern region read out by said barcode recognition means in a predetermined format, and outputting a result of said editing.

* * * * *